F. ROSE.
TIRE OF VEHICLE WHEELS.
APPLICATION FILED MAR. 31, 1911.
1,038,441.
Patented Sept. 10, 1912.
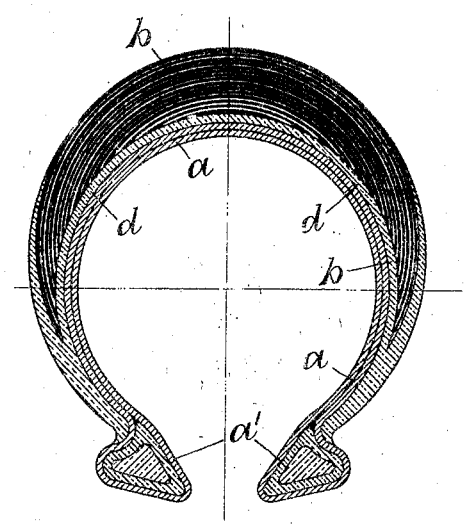
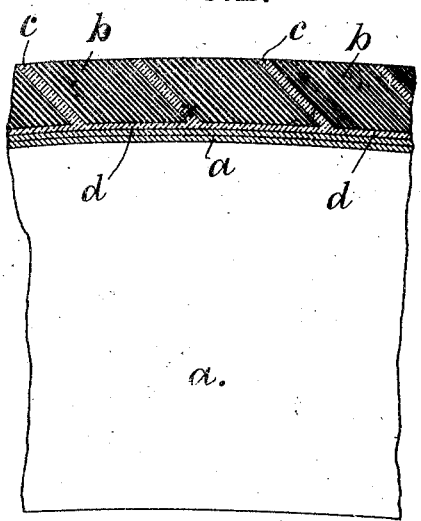
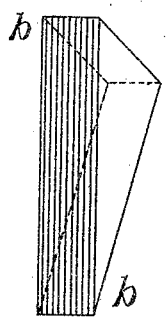
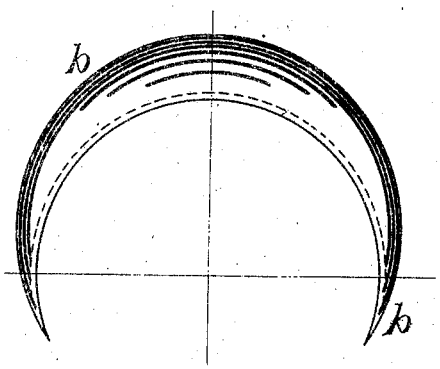

UNITED STATES PATENT OFFICE.

FREDERICK ROSE, OF LIVERPOOL, ENGLAND.

TIRE OF VEHICLE-WHEELS.

1,038,441.　　　　Specification of Letters Patent.　　Patented Sept. 10, 1912.

Application filed March 31, 1911. Serial No. 618,103.

*To all whom it may concern:*

Be it known that I, FREDERICK ROSE, L. D. S., R. C. S., a subject of the King of England, residing at Liverpool, in the county of Lancaster, England, have invented certain new and useful Improvements in and Connected with the Tires of Vehicle-Wheels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has reference to the tires of vehicle wheels and the like, and more particularly to that kind of tire wherein the tread portion is composed of or contains rubber and canvas or other like textile fabric, the latter being so disposed in the body of the rubber that the ends or edges of the fabric come next to the road surface on or over which the wheel travels.

In tires or tire treads hitherto constructed of textile fabric and rubber it has been proposed to arrange the fabric in the rubber so as to be so disposed in the tread as to act edgewise on the road surface. This construction however, has not been satisfactory; and the primary object of this invention is to render tires of the kind concerned satisfactory, and to generally improve them.

In the following description of an outer cover for a pneumatic tire, the improvements under this invention are comprised.

The invention is illustrated in the accompanying drawings, in which—

Figure 1 is a cross section of a tire according to the invention, and Fig. 2 is a longitudinal section; while Figs. 3 and 4 are side view and end view respectively, of a block or set of laminæ.

Referring now to the drawings, $a$ represents the backing or foundation of the tire, $a^1$ being the enlarged edges which fit within the rim of the wheel.

$b$ generally designates blocks or sets of a plurality of laminæ of textile fabric adhered together, and between all of these blocks there is a lamina $c$ of rubber of substantial thickness, such as will form a spring between them; while another lamina of rubber $d$ is provided between the backing or foundation $a$ and the inner edges of the blocks $b$ which also constitutes a spring; and these rubber portions $c$ and $d$ are, in the completed tire, practically one, and provide spring supports to the blocks $b$ in all directions and allow play or movement of them in all directions.

The drawings, especially Figs. 2 and 3, illustrate the oblique placing of the textile or like material laminæ constituting the blocks $b$, and by an obliquity of about that shown, the tires are rendered immune or practically immune against puncture.

The blocks $b$ are made of crescent form, as shown more clearly in Figs. 3 and 4; they being relatively broad at the center or highest part, and tapering down gradually to their edges; and the several laminæ of canvas or the like of which they are formed, are cut to this shape, and will be coated on one or both sides by a thin film or wash of rubber or like material, in some cases, in addition to their being impregnated with rubber. The pieces of crescent form are in building up a block $b$, taken and laid on a mandrel, or the tire backing or foundation itself, at an oblique angle, such as shown, one upon the other, and adhered together by rubber or the like, on one or both surfaces; and the oblique crescent shaped blocks thus formed, are then laid on the foundation or backing $a$, upon the layer of rubber or like material $d$ thereon, and assembled, and finished: a relatively thick lamina $c$ of rubber being provided between all the blocks $b$, so that they are supported, in fact, on springs both radially and circumferentially.

By this construction of tire, when the wheel is rotating under a vehicle, the weight of the car compresses the laminæ close together, so rendering its power of resisting puncture greater.

In use, the textile tangential or oblique pieces will lie, as regards the direction of revolution of the wheel, with the upper edges (that is, those at the surface) to the rear, radially, of the inner edges. It will thus be seen that to obtain the best results from a tread or tire constructed as described, it, the tire, must always be placed on the wheel in this direction.

The spaced obliquely disposed elastic protections form crescent shape pockets, which receive the similarly shaped blocks. Because of the shape and disposition of the blocks the inner, or tapered ends, are at all times rigid with the body of the tire. Hence, when load pressure is applied to the tire structure, the tread portions of the blocks will yield along a substantially horizontal line, while the inner or small ends remain fixed.

What is claimed is:—

A vehicle wheel tire tread comprising a tread foundation, a continuous elastic member mounted on the tread foundation and provided with upstanding projections which are obliquely disposed relatively to radial lines passing through the axis of the wheel, the body portion of said elastic member and the oblique upstanding projections, constituting the walls of pockets and crescent shaped blocks of considerably greater thickness, than the upstanding projections and which fit into the pockets, each crescent shape block comprising a plurality of layers of textile material, each layer being disposed parallel to the said upstanding projections, and extending from the tread surface to the bottom of the pockets as a flat member, whereby all strains occurring to the tread surface are deflected in the circumferential, as well as radial directions of the wheels and are cushioned in each direction.

In testimony whereof I have signed my name to this specification in the presence of two subscribing witnesses.

FREDERICK ROSE.

Witnesses:
  WILLIAM T. ROGERS,
  SOMERVILLE GOODALL.